US011947313B2

(12) United States Patent
Wada et al.

(10) Patent No.: US 11,947,313 B2
(45) Date of Patent: Apr. 2, 2024

(54) TONER AND TWO-COMPONENT DEVELOPER

(71) Applicant: SHARP KABUSHIKI KAISHA, Sakai (JP)

(72) Inventors: Osamu Wada, Sakai (JP); Yoritaka Tsubaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 172 days.

(21) Appl. No.: 17/224,417

(22) Filed: Apr. 7, 2021

(65) Prior Publication Data

US 2021/0325795 A1 Oct. 21, 2021

(30) Foreign Application Priority Data

Apr. 17, 2020 (JP) ................................ 2020-074154

(51) Int. Cl.

| | |
|---|---|
| ***G03G 9/087*** | (2006.01) |
| ***G03G 9/08*** | (2006.01) |
| ***G03G 9/097*** | (2006.01) |
| ***G03G 9/113*** | (2006.01) |

(52) U.S. Cl.

CPC ....... *G03G 9/09733* (2013.01); *G03G 9/0819* (2013.01); *G03G 9/0821* (2013.01); *G03G 9/08755* (2013.01); *G03G 9/1138* (2013.01)

(58) Field of Classification Search

CPC ........... G03G 9/08755; G03G 9/08795; G03G 9/08797; G03G 9/08782; G03G 9/1088

See application file for complete search history.

(56) References Cited

FOREIGN PATENT DOCUMENTS

| | | | | |
|---|---|---|---|---|
| EP | 2209049 A1 | | 7/2010 | |
| JP | 2002-365843 | * | 12/2002 | ............. G03G 9/087 |
| JP | 2007-057822 | * | 3/2007 | ............. G03G 9/113 |
| JP | 2008070577 A | | 3/2008 | |
| JP | 2010-164909 A | | 7/2010 | |
| JP | 2015031767 A | | 2/2015 | |
| WO | WO 2014-069418 | * | 5/2014 | ......... G03G 9/08782 |
| WO | WO 2019-107087 | * | 6/2019 | ............. G03G 9/087 |

OTHER PUBLICATIONS

Translation of JP 2007-057822.*
Translation of WO 2019-107087.*
Translation of WO 2014-069418.*
Translation of JP 2002-365843.*

* cited by examiner

*Primary Examiner* — Peter L Vajda
(74) *Attorney, Agent, or Firm* — ScienBiziP, P.C.

(57) ABSTRACT

The peak top molecular weight of the tetrahydrofuran-soluble component of the toner, as measured by gel permeation chromatography, is 4,000 or more and 6,500 or less. The tetrahydrofuran-insoluble component of the toner is 10% by weight or more and 30% by weight or less. When the endothermic peak temperature T1 in the heating process and the exothermic peak temperature T2 during the cooling process originating from the ester wax is measured using a differential scanning calorimeter, the value T1-T2 is 15° C. or more and 30° C. or less.

5 Claims, No Drawings

TONER AND TWO-COMPONENT DEVELOPER

BACKGROUND OF THE INVENTION

Field of the Invention

The present invention relates to a toner and a two-component developer.

Description of the Background Art

As image forming devices such as copiers, multifunction peripherals, printers, and facsimile devices using the electrographic method become more energy efficient, toners with an improved low-temperature fixability are being sought.

In order to improve the low-temperature fixability, it is conceivable to include a low-viscosity component in the binder resin included in the toner. However, when a low-viscosity component is included, there is a problem that the high-temperature fixability decreases.

In order to maintain the high-temperature fixability, it is conceivable to further include a high-elasticity component in the binder resin. However, because the viscosity difference between the resins becomes too large, the resins do not mix well during melt kneading. Therefore, the dispersion state of the resin component deteriorates. Consequently, simply including both a low-viscosity component and a high-elasticity component in the binder resin does not allow the characteristics of both components to be utilized. Therefore, there is a problem that neither the low-temperature fixability or the high-temperature fixability are improved.

A wax which serves as a mold release agent is generally bled onto the surface of the toner layer at the time of fixing, and is added for the purpose of enhancing the smoothness of mold release between the fixing roller and the toner layer. Therefore, the wax which is used needs to bleed quickly onto the surface of the toner layer when heat is applied. In order to exhibit such a characteristic, it is preferable to use a wax having a high degree of crystallinity.

In a measurement using a differential scanning calorimeter (DSC), a wax having a high degree of crystallinity has a very small difference between the endothermic peak temperature in the heating process and the exothermic peak temperature in the cooling process (hereinafter, appropriately referred to as "DSC temperature A"). As a result of using such a wax, the mold release effect of the wax is increased, and the high-temperature side of the fixable region can be expanded. However, the affinity with the binder resin decreases, and an effect which improves the material dispersion during melt kneading cannot be expected. Furthermore, in a high temperature environment, there is a problem that the wax bleeds from the toner surface, which causes the heat-resistant storage stability to deteriorate. In addition, although the glossiness of the image can be increased if a large amount of wax is present on the toner surface after fixing, because the glossiness depends on the amount of wax bleed, there is a problem that deviations in the fixing temperature will cause deviations in the gloss, thereby causing gloss unevenness.

In contrast, as a toner having mold release agent with a large DSC temperature A, disclosed in Japanese Unexamined Patent Application Publication No. 2010-164909 is a transparent toner for developing an electrostatic latent image in which, when the endothermic peak Tm of the mold release agent in a heating process and the exothermic peak Tc of the mold release agent are measured by the ASTM method using a differential scanning calorimeter (DSC), the difference between Tm and Tc is 10° C. or more and 50° C. or less.

SUMMARY OF THE INVENTION

The present invention has been made based on the circumstances described above. An object of the present invention is to provide a toner and a two-component developer capable of achieving both low-temperature fixability and high-temperature fixability, and suppressing gloss unevenness.

In order to solve the above problems, the present invention provides a toner and a two-component developer as follows.

(1) Toner

A toner according to the present invention includes toner particles containing a polyester resin as a binder resin, and an ester wax as a mold release agent. The peak top molecular weight of the tetrahydrofuran (THF) soluble component of the toner, as measured by gel permeation chromatography, is 4,000 or more and 6,500 or less. The tetrahydrofuran-insoluble component of the toner is 10% by weight or more and 30% by weight or less with respect to 100% by weight of the toner. When the endothermic peak temperature T1 in the heating process and the exothermic peak temperature T2 during the cooling process originating from the ester wax are measured using a differential scanning calorimeter, the value T1-T2 is 15° C. or more and 30° C. or less.

(2) Two-Component Developer

A two-component developer according to the present invention includes the toner according to the present invention, and a carrier. The carrier has a carrier core material, and a resin coating layer that coats the carrier core material. Given the SP value of a resin in the resin coating layer SP1, the SP value of the ester wax SP2, and the SP value of the binder resin SP3, SP1<SP2<SP3 and SP2-SP1>1.

According to the present invention, both low-temperature fixability and high-temperature fixability can be achieved, and gloss unevenness can be suppressed.

Description of the Preferred Embodiments

The present invention includes a toner and a two-component developer. Hereinafter, these will be described in detail.

Toner and Toner Particles

The toner according to the present invention includes toner particles containing a binder resin and a mold release agent. Further, additional components may be included as necessary, as long as the effect of the present invention is not impaired. The volume average particle size of the primary particles of the toner particles is not particularly limited. However, examples include toner particles having a volume average particle size of 4 μm or more and 8 μm or less.

The toner according to the present invention includes toner particles containing a polyester resin as a binder resin, and an ester wax as a mold release agent. The peak top molecular weight (Mp) of the tetrahydrofuran (THF) soluble component of the toner, as measured by gel permeation chromatography (GPC), is 4,000 or more and 6,500 or less. The tetrahydrofuran (THF) insoluble component of the toner is 10% by weight or more and 30% by weight or less with respect to 100% by weight of the toner. When the endothermic peak temperature T1 in the heating process and the exothermic peak temperature T2 during the cooling process originating from the ester wax are measured using a differential scanning calorimeter (DSC), the value T1-T2 is 15° C. or more and 30° C. or less.

That is to say, the toner according to the present invention includes, as a binder resin, a very low-viscosity component (in which the Mp is 4,000 or more and 6,500 or less) and a very high-elasticity component (a THF-insoluble component (gel component) of 10% by weight or more and 30% by weight or less), and includes a low-crystallinity ester wax (in which the value T1-T2 is 15° C. or more and 30° C. or less). The mold release effect inherent to wax is low in such an ester wax. However, as described above, when a very low-viscosity component and a very high-elasticity component are used as the binder resin, the ester wax acts as a lubricant during melt-kneading of the binder resin material. Therefore, the components can be well-blended despite the large difference in viscosity between the resins. As a result, it is possible to realize a toner that has both low-temperature fixability originating from the low-viscosity component and high-temperature fixability originating from the high-elasticity component. In addition, by including a large amount of the high-elasticity component in the toner, it is possible to form an image with suppressed image gloss and with low gloss unevenness. Further, because the wax in the toner does not easily bleed onto the surface of the toner layer, the amount of wax on the image surface after fixing is small. Therefore, the deviation in glossiness can be suppressed, and images without gloss unevenness can be stably formed.

In the toner according to the present invention, given an outflow start temperature Ti, and a softening temperature is Tm measured by a flow tester, it is preferable that Ti is 85° C. or more and 95° C. or less, Tm is 120° C. or more and 140° C. or less, and the value Tm-Ti is 25° C. or more and 50° C. or less. As a result of Tm and Ti having such a relationship, both low-temperature fixability and high-temperature fixability can be achieved.

If Ti is less than the above lower limit, the heat-resistant storage stability of the toner deteriorates. If Ti exceeds the above upper limit, the low-temperature fixability becomes insufficient. If Tm is less than the above lower limit, the high-temperature fixability becomes insufficient. If Tm exceeds the above upper limit, the low-temperature fixability becomes insufficient even when Ti is lowered.

Binder Resin

The toner particles according to the present invention include a polyester resin as a binder resin. The content of the polyester resin is preferably 70% by weight or more and 94% by weight or less with respect to 100% by weight of the toner particles. Furthermore, the content of the polyester resin is preferably 80% by weight or more, and more preferably 90% by weight or more with respect to 100% by weight of the binder resin. The binder resin may include a component other than the polyester resin as long as the effect of the present invention is not impaired.

The polyester resin used as the binder resin is not particularly limited, and those usually used in a toner can be used. The binder resin of the present invention is preferably an amorphous polyester resin.

The polyester resin is mainly obtained by polycondensation of a polyhydric alcohol and a polyvalent carboxylic acid.

Examples of polyhydric alcohols include aliphatic polyhydric alcohols, alkylene ether glycols, alicyclic polyhydric alcohols, and aromatic polyhydric alcohols. These may be used alone or in combination of two or more.

Examples of aliphatic polyhydric alcohols include ethylene glycol, propylene glycol, butanediol, butenediol, pentane glycol, neopentyl glycol, hexane glycol, and glycerin.

Examples of alkylene ether glycols include diethylene glycol, triethylene glycol, dipropylene glycol, polyethylene glycol, and polypropylene glycol.

Examples of alicyclic polyhydric alcohols include cyclohexanediol, cyclohexanedimethanol, and hydrogenated bisphenol A.

Examples of aromatic polyhydric alcohols include bisphenols such as bisphenol A, bisphenol F, and bisphenol S; and alkylene oxide adducts of bisphenols such as bisphenol A ethylene oxide adducts and bisphenol A propylene oxide adducts.

Examples of polyvalent carboxylic acids include aliphatic polyvalent carboxylic acids, alicyclic polyvalent carboxylic acids, aromatic polyvalent carboxylic acids, anhydrides of these carboxylic acids, and lower alkyl esters of these carboxylic acids. These may be used alone or in combination of two or more.

Examples of aliphatic polyvalent carboxylic acids include maleic acid, fumaric acid, succinic acid, alkenyl succinic acid, adipic acid, malonic acid, sebacic acid, and azelaic acid. Examples of alicyclic polyvalent carboxylic acids include cyclohexanedicarboxylic acid. Examples of aromatic carboxylic acids include phthalic acid, terephthalic acid, isophthalic acid, mellitic acid, pyromellitic acid, and naphthalenedicarboxylic acid. Examples of lower alkyl esters include alkyl esters having 1 to 4 carbon atoms. Examples of alkyl esters having 1 to 4 carbon atoms include ester compounds formed with methyl, ethyl, n-propyl, i-propyl, n-butyl, i-butyl, sec-butyl, and tert-butyl alcohols.

THF-Soluble Component

In the toner according to the present invention, the THF-soluble component has a peak top molecular weight (Mp), as measured by GPC, of 4,000 or more and 6,500 or less. If the peak top molecular weight (Mp) is less than the above lower limit, the heat-resistant storage stability deteriorates, and the high-temperature fixability also becomes insufficient. If the peak top molecular weight (Mp) exceeds the above upper limit, a sufficient low-temperature fixability cannot be obtained.

THF-Insoluble Component

The THF-insoluble component of the toner according to the present embodiment is 10% by weight or more and 30% by weight or less with respect to 100% by weight of the toner. If the THF-insoluble component is less than the above lower limit, the high-temperature fixability becomes insufficient. If the THF-insoluble component exceeds the above upper limit, the material dispersion in the kneading step becomes insufficient even if the ester wax described above is used. As a result, the balance between the low-temperature fixability, heat-resistant storage stability, and high-temperature fixability deteriorates.

Mold Release Agent

The toner particles according to the present invention include an ester wax as a mold release agent. If a hydrocarbon wax is used instead of an ester wax, the dispersibility within the polyester resin serving as the binder resin deteriorates. Consequently, a burn-in phenomenon or the like may more readily occur on the developing roller with long term use, resulting in image defects.

In the toner described above, when the endothermic peak temperature T1 in the heating process and the exothermic peak temperature T2 during the cooling process originating from the ester wax is measured using a DSC, the value T1-T2 is 15° C. or more and 30° C. or less, and the value T1-T2 is preferably 18° C. or more. If the value T1-T2 is less than the above lower limit, the action of the ester wax as a lubricant becomes insufficient, and the low-viscosity component and the high-elasticity component cannot be well-blended in the kneading step. Therefore, both low-temperature fixability and high-temperature fixability cannot be achieved. An ester wax in which the value T1-T2 exceeds the above upper limit is difficult to produce, which makes the characteristics difficult to confirm. However, the plasticizing effect may become too high, causing a deterioration of the heat-resistant storage stability.

The ester wax serving as the mold release agent of the toner according to the present invention is not particularly limited as long as it satisfies the above, namely that the value T1-T2 is 15° C. or more and 30° C. or less. For example, a synthetic ester wax can be used. Examples of such synthetic ester waxes include product names WE-15, WE-14, and WEP-5 manufactured by NOF Corporation.

The content of the ester wax included in the toner according to the present invention is preferably 0.5% by weight or more and 5.0% by weight or less with respect to 100% by weight of the toner particles, and more preferably 2% by weight or more and 4% by weight or less. By setting the content of the ester wax within the ranges above, it is possible to improve the blending of binder resin materials having a large viscosity difference in the kneading step. Therefore, both low-temperature fixability and high-temperature fixability can be more easily achieved.

If the content of the ester wax is less than the above lower limit, the effect described above of including the ester wax may not be sufficiently obtained. If the content of the ester wax exceeds the above upper limit, the dispersibility of the wax deteriorates, and more wax becomes exposed from the toner surface, or more wax becomes separated from the toner particles. Consequently, a burn-in phenomenon or the like may more readily occur on the developing roller with long term use, resulting in image defects. Further, the heat-resistant storage stability may deteriorate.

Furthermore, the average dispersion diameter of the ester wax in the toner particles according to the present invention is preferably 0.2 μm or more and 2.0 μm or less, and more preferably 0.5 μm or more and 1.0 μm or less. By setting the average dispersion diameter of the ester wax within the ranges above, it is possible to improve the blending of binder resin materials having a large viscosity difference in the kneading step. Therefore, both low-temperature fixability and high-temperature fixability can be more easily achieved.

If the average dispersion diameter of the ester wax is less than the above lower limit, the compatibility between the ester wax and the resin becomes too high. Therefore, that the toner particles may become plastic, causing the heat-resistant storage stability to deteriorate. If the average dispersion diameter of the ester wax exceeds the above upper limit, more free wax is generated. Consequently, it may become difficult to ensure the heat-resistant storage stability.

Polyester Resin

Furthermore, the toner particles according to the present invention preferably contain a styrene-acrylic resin. Compared with the polyester resin serving as the binder resin, styrene-acrylic resins have better compatibility with the ester wax, improves the dispersibility of the wax, and appropriately suppresses the wax from bleeding. Therefore, by incorporating a styrene-acrylic resin into the toner, the heat-resistant storage stability and gloss unevenness can be further improved. Moreover, because the pulverizability is improved by including a styrene-acrylic resin, the amount of wax exposed on the toner surface can be suppressed. As a result, the heat-resistant storage stability can be improved.

The styrene-acrylic resin is not particularly limited, and those usually used in the technical field to which the present invention belongs can be used. Examples include resins obtained by polymerizing one or more of the following monomers by a known polymerization reaction. Examples of monomers constituting the styrene-acrylic resin include: styrene derivatives such as styrene, o-methylstyrene, m-methylstyrene, p-methylstyrene, a-methylstyrene, p-ethylstyrene, and 2,4-dimethylstyrene; and acrylic acid derivatives and methacrylic acid derivatives such as acrylic acid, methyl acrylate, ethyl acrylate, n-butyl acrylate, isobutyl acrylate, propyl acrylate, octyl acrylate, 2-chloroethyl acrylate, phenylacrylic acid, methacrylic acid, methyl methacrylate, ethyl methacrylate, propyl methacrylate, n-butyl methacrylate, isobutyl methacrylate, n-octyl methacrylate, 2-ethylhexyl methacrylate, phenyl methacrylate, and dimethylamino methacrylate ester. The monomers above may also be partially modified.

The content of the styrene-acrylic resin above is preferably 1% by weight or more and 10% by weight or less with respect to 100% by weight of the toner particles, and more preferably 3% by weight or more and 7% by weight or less. If the content of the styrene-acrylic resin is less than the above lower limit, the effect described above may not be exhibited. Furthermore, because the styrene-acrylic resin has a lower affinity with paper than the polyester resin serving as the binder resin, if the content of the styrene-acrylic resin exceeds the above upper limit, the low-temperature fixability may deteriorate.

Other Internal Additives

The toner particles according to the present invention may include internal additives other than those described above as necessary. Examples of internal additives other than those described above include colorants and charge control agents. The colorant and the charge control agent are dispersed in the binder resin.

The colorant is not particularly limited, and organic dyes, organic pigments, inorganic dyes, inorganic pigments, and the like used in the electrophotography field can be used.

Examples of black colorants that can be used include carbon black, copper oxide, manganese dioxide, aniline black, activated carbon, non-magnetic ferrite, magnetic ferrite and magnetite.

Examples of yellow colorants that can be used include C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 138, C.I. Pigment Yellow 180, and C.I. Pigment Yellow 185.

Examples of magenta colorants that can be used include C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of cyan colorants include C.I. Pigment Blue 15, C.I. Pigment Blue 15:2, C.I. Pigment Blue 15:3, C.I. Pigment Blue 16, and C.I. Pigment Blue 60.

The content of the colorant in the toner according to the present invention is not particularly limited. However, the content is preferably 4% by weight or more and 10% by weight or less with respect to 100% by weight of the toner particles. The colorant may be used alone or in combination of two or more. The colorant may be used in a masterbatch in order to be uniformly dispersed in the binder resin.

The charge control agent is added to impart favorable chargeability to the toner. The charge control agent is not particularly limited, and charge control agents for positive charge control and negative charge control used in the electrophotography field can be used.

Examples of charge control agents for positive charge control that can be used include quaternary ammonium salts, pyrimidine compounds, triphenylmethane derivatives, guanidine salts, and amidine salts.

Examples of charge control agents for negative charge control that can be used include metal-containing azo compounds, azo complex dyes, metal complexes and metal salts of salicylic acid and its derivatives (the metal being chromium, zinc, zirconium, and the like), organic bentonite compounds, and boron compounds.

The content of the charge control agent in the toner according to the present invention is not particularly limited. However, the content is preferably 0.5% by weight or more and 5% by weight or less with respect to 100% by weight of the toner particles. The charge control agent may be used alone or in combination of two or more.

External Additive

The toner according to the present invention may contain an external additive as necessary. The external additive adheres to the surface of the toner particles. In the following, among the toners according to the present invention, those toners which have toner particles with an external additive adhered to the surface are referred to as external toners.

The external additive is not particularly limited, and external additives used in the electrophotography field can be used. The content of the external additive in the toner according to the present invention is not particularly limited. However, the content is preferably 0.5% by weight or more and 3% by weight or less with respect to 100% by weight of the toner particles. The external additive may be used alone or in combination of two or more.

Two-Component Developer and Carrier

The two-component developer according to the present invention includes the toner according to the present invention, and a carrier. The two-component developer can be produced by mixing the toner and the carrier using a known mixer. The weight ratio of the toner to the carrier is not particularly limited. Examples of the weight ratio include 3:97 to 12:88.

The carrier is stirred and mixed with the toner in a developing tank to give the toner the desired charge. Furthermore, the carrier acts as an electrode between a developing device and a photosensitive body. The carrier carries the charged toner to an electrostatic latent image formed on the photosensitive body, and serves the role of forming a toner image. The carrier is held on a developing roller of the developing device by a magnetic force. Then, after the carrier acts on the development, it is returned to the developing tank, where it is stirred and mixed once again with new toner, and is used repeatedly until the end of its useful life.

The carrier has a carrier core material, and a resin coating layer that coats the carrier core material. The carrier core material is not particularly limited as long as it is used in the electrophotography field. Specific examples of the material of the carrier core material include magnetic metals such as iron, copper, nickel and cobalt, and magnetic metal oxides such as ferrite and magnetite. The volume average particle size of the carrier core material is not particularly limited, and examples include 30 μm or more and 100 μm or less. The resin coating layer preferably contains a silicone resin or an acrylic resin. Silicone resins can delay the progress of contamination of the carrier coating layer, and are suitable for long-life use.

In the two-component developer according to the present invention, given the SP value of a resin in the resin coating layer SP1, the SP value of the ester wax SP2, and the SP value of the binder resin SP3, SP1<SP2<SP3, and SP2-SP1>1.

By satisfying the above relational expressions, the durability of the two-component developer can be improved, the charging ability of the carrier can be maintained even after long-term use, and stable images can be formed throughout the useful life. The reason for this is considered to be as follows.

In general, in a two-component developer, the toner component contaminates the carrier surface and causes the charging ability of the carrier to deteriorate after long-term use. In particular, the wax in the toner is the most likely to cause contamination. On the other hand, because the wax in the toner according to the present invention does not easily bleed and is less likely to be exposed on the toner surface, the carrier is less contaminated in the first place. In addition, in the two-component developer according to the present invention, when the SP values satisfy the above relationships, it becomes more difficult for the resin coating layer and the wax to blend, and wax contamination of the carrier surface is further suppressed. Therefore, the charging ability of the carrier can be maintained at a higher level, and stable images can be formed over a long period of use.

In order for such an effect to be exhibited, it is important that the difference between SP1 and SP2 is large. However, if SP1 is increased in an attempt to increase the difference between SP1 and SP2, the value of SP1 inevitably approaches SP3. That is to say, the resin coating layer of the carrier and the binder resin of the toner become more easily blended, which causes contamination of the carrier surface to progress. Because it is difficult in practice to set SP1 to a value much larger than SP3, it is important that SP1, SP2, and SP3 satisfy the above relationship so that the difference between SP1 and SP2 is increased.

EXAMPLES

The present invention will be described below based on Examples and Comparative Examples. However, the present invention is not limited to these Examples. First, the measurements performed in the Examples and the like will be described.

Measurement Method of Peak Top Molecular Weight (Mp)

The peak top molecular weight (Mp) of the binder resin and the toner was measured by gel permeation chromatography (GPC) under the following conditions. Furthermore, for the measurement of the molecular weight, a sample solution obtained by dissolving the polyester resin in tetrahydrofuran (THF), and then filtering off the insoluble component using a glass filter was used. The peak top molecular weight refers to the molecular weight showing the maximum peak height in the chromatogram obtained by the GPC measurement.

Device: HLC-8120 manufactured by Tosoh Corporation

Columns: 2×TSK GEL GMH6 [manufactured by Toso Corporation]

Measurement temperature: 40° C.

Sample solution: 0.25 mass % THF (tetrahydrofuran) solution

Solution injection amount: 100 μL

Detection device: Refractive index detector

Reference materials: Standard polystyrene (TSKstandard POLYSTYRENE) manufactured by Tosoh Corporation; 12 samples (molecular weights of 500, 1,050, 2,800, 5,970, 9,100, 18,100, 37,900, 96,400, 190,000, 355,000, 1,090,000, and 2,890,000)

Measurement Method of THF-Insoluble Component (Gel Component) Content in Toner

The content was calculated from the amount of the THF-insoluble component before and after the GPC measurement above.

Measurement Method of Endothermic Peak Temperature in Heating process and Exothermic Peak Temperature in Cooling Process Using a differential scanning calorimeter (product name: DSC 220, manufactured by Seiko Electronics Industry Co., Ltd), a DSC curve was measured by heating 1 g of the sample to 150° C. at a heating rate of 10° C./min, holding the sample at 150° C. for 2 minutes, and then cooling the sample to 30° C. at a cooling rate of 10° C./min. The endothermic peak temperature in the heating process and the exothermic peak temperature in the cooling process were determined for the obtained DSC curve.

Measurement Method of Outflow Start Temperature and Softening Temperature of Toner Using a flow characteristic evaluation device (manufactured by Shimadzu Corporation, flow tester, model number: CFT-100C), a load of 20 kgf/cm$^2$ (9.8×10$^6$ Pa) was applied to 1 g of the sample while heating from a start temperature of 40° C. at a heating rate of 6° C./min, causing the sample to flow out from a die (nozzle diameter 1 mm, length 1 mm). The temperature at which the material began to flow out was defined as the outflow start temperature "Ti". The temperature at which half of the sample had flowed out was defined as the softening temperature "Tm".

Measurement Method of Dispersion Diameter of Ester Wax

A sample was obtained by embedding the toner in an epoxy resin followed by surfacing using an ultramicrotome (manufactured by Reichert Inc., product name: Ultracut N). The dispersion state of the mold release agent (wax) in the obtained sample was observed using a scanning transmission electron microscope (manufactured by Hitachi High-Technologies Corporation, model number: S-4800). As a result of randomly extracting 200 to 300 wax portions from the obtained electron micrograph data and performing image analysis using image analysis software (product name: Azo-kun, manufactured by Asahi Kasei Engineering Corporation), the equivalent circle diameter (μm) of the wax was determined, and this was used as the dispersion diameter (μm) of the wax.

Calculation Method of SP Values

The SP values were calculated according to the method proposed by Fedors as described in "Polymer Engineering and Science, February, 1974, Vol. 14, No. 2, Robert F. Fedors. (pp. 147-154)".

Evaluation Method of Fixing Performance (Low-Temperature Fixability and High-Temperature Fixability)

A fixed image was formed by the two-component developer using a commercially available copying machine (manufactured by Sharp Corp, model number: MX-5100FN) modified for evaluation purposes. First, a sample image including a solid image (a rectangle of 20 mm height and 50 mm width) was formed as an unfixed image on a sheet of recording paper (manufactured by Sharp Corporation, PPC paper, model number: SF-4AM3). At this time, the amount of toner adhered to the recording paper in the solid image was adjusted to 0.5 mg/cm$^2$.

Next, a fixed image was prepared using a hard roller fixing device. The fixing process speed was set to 120 mm/sec, and the temperature of the fixing roller was raised from 110° C. in 5° C. increments to obtain a minimum temperature at which a low-temperature offset did not occur, and a maximum temperature at which a high-temperature offset did not occur.

The "low-temperature offset" and the "high-temperature offset" are defined as situations where the toner is not fixed to the recording paper at the time of fixing, but is attached to the recording paper after the fixing belt has made an entire loop while the toner is still attached to the fixing belt.

From the obtained results, the "low-temperature fixability" was judged according to the following criteria.

●: Excellent (minimum temperature was 105° C. or less)

○: Good (minimum temperature was 110° C. or more and less than 120° C.)

Δ: Fair (minimum temperature was 120° C. or more and less than 130° C.)

x: Poor (minimum temperature was 130° C. or more)

Furthermore, from the obtained results, the "high-temperature fixability" was judged according to the following criteria.

●: Excellent (maximum temperature was 195° C. or more)

○: Good (maximum temperature was 185° C. or more and less than 195° C.)

Δ: Fair (maximum temperature was 175° C. or more and less than 185° C.)

x: Poor (maximum temperature was less than 175° C.)

Evaluation Method of Gloss Unevenness

The image gloss values at the minimum fixable temperature at the time of the fixability evaluation, and at the minimum temperature+30° C. were measured using a gloss meter (manufactured by Nippon Denshoku Industries Co., Ltd., model number: VG2000). Then, a gloss A ("gloss at minimum temperature"–"gloss at minimum temperature+30") was calculated.

From the obtained results, the "gloss unevenness" was judged according to the following criteria.

●: Excellent (gloss A was less than 5)

○: Good (gloss A was 5 or more and less than 8)

Δ: Fair (gloss A was 8 or more and less than 11)

x: Poor (gloss A was 11 or more)

Evaluation Method of Heat-Resistant Storage Stability

The heat-resistant storage stability was evaluated based on the presence or absence of aggregates after high-temperature storage. A 20 g sample of the external toner was sealed in a plastic container. After being left at 50° C. for 72 hours, the toner was taken out and sieved through a 230-mesh sieve. The weight of the toner remaining on the sieve was measured, and the residual amount, which is the ratio of this weight to the total weight of the toner, was calculated and then evaluated according to the following evaluation criteria. The lower the value of the residual amount, the less blocking that has been caused by the toner, which indicates that the toner particles have been sufficiently coated by the coating layer.

The evaluation criteria were as follows.

●: Excellent No aggregation. Residual amount was less than 0.5%.

○: Good Small amount of aggregation. Residual amount was 0.5% or more and less than 7%.

Δ: Fair Large amount of aggregation. Residual amount was 7% or more and less than 12%.

x: Poor Large amount of aggregation. Residual amount was 12% or more.

Evaluation Method of Burn-In Phenomenon

The prepared two-component developer and toner were respectively filled in a developing device and a toner cartridge of a color multifunction peripheral (product name: BP-20C25, manufactured by Sharp Corporation). Then, a continuous print test of 50,000 sheets was carried out at 30° C. in an 80% humidity environment such that square solid images (ID=1.45 to 1.50) with 1 cm sides were formed at three positions corresponding to the center and both ends of the axial direction of the developing roller.

The evaluation criteria of the burn-in phenomenon were as follows.

●: Excellent No decrease in concentration (ΔID (initial-50,000 sheets): less than 0.1), no toner fusion on surface of developing roller.

○: Good No decrease in concentration (ΔID: less than 0.1), but toner fusion observed on surface of developing roller.

Δ: Fair Small decrease in concentration (ΔID: 0.1 or more and less than 0.2), toner fusion on surface of developing roller.

x: Poor Large decrease in concentration (ΔID: 0.2 or more), toner fusion on surface of developing roller.

Evaluation Method of Charging Stability

The prepared two-component developer and toner mentioned above were respectively filled in a developing device and a toner cartridge of a color multifunction peripheral (product name: MX-2640, manufactured by Sharp Corporation). Then, a continuous print test of 50,000 sheets was carried out at 25° C. in an 50% humidity environment such that square solid images (ID=1.45 to 1.50) with 1 cm sides were formed at three positions corresponding to the center and both ends of the axial direction of the developing roller. The amount of charge (μC/g) in the two-component developer before and after the test was measured using a suction-type charge amount measurement device (manufactured by Trek Co., Ltd., model number: Model 210HS). The amount of charge was evaluated according to the following criteria using the absolute value of the difference between these values.

●: Excellent (difference in amount of charge was 3 μC/g or less)

○: Good (difference in amount of charge exceeded 3 μC/g and was 5 μC/g or less)

Δ: Fair (difference in amount of charge exceeded 5 μC/g and was 10 μC/g or less)

x: Poor (difference in amount of charge exceeded 10 μC/g)

Overall Evaluation Method for Toner and Two-Component Developer

An overall evaluation was performed according to the following criteria based on the evaluation results above.

●: Excellent: all evaluation criteria are ●. Usable.

○: Good: One or more evaluation criteria are ○. Usable.

Δ: Fair: One or more evaluation criteria are Δ. Usable.

x: Poor: One or more evaluation criteria are x. Unusable.

Example 1

Material Mixing/Kneading/Pulverization/Classification Processes

The components below were pre-mixed for 5 minutes using a Henschel mixer. Then, the mixture was melt-kneaded using a twin-screw extruder at a cylinder set temperature of 110° C., a barrel rotation speed of 300 rpm, and a raw material supply rate of 20 kg/hour, giving a melt-kneaded product.

Binder resin (amorphous polyester resin (aromatic alcohol components: PO-BPA (propoxylated bisphenol A) and EO-BPA (ethoxylated bisphenol A), acid components: fumaric acid and mellitic anhydride)

Resin A: 42% by weight

Resin B: 42% by weight

Colorant: Carbon black (manufactured by Cabot Corporation, product name: Regal 330) 6% by weight Mold release agent: Wax (1) (ester-based, Tm: 76° C.) 3% by weight Mold release agent dispersant: Styrene-acrylic copolymer resin (manufactured by Mitsui Chemicals, Inc., product name: SA800) 5% by weight Charge control agent: Salicylic acid compound (manufactured by Orient Chemical Industries Co., Ltd., product name: Bontron E-84) 2% by weight The obtained melt-kneaded product was cooled with a cooling belt, and then coarsely pulverized using a cutting mill. Then, the product was finely pulverized using a jet crusher and further classified using a wind classifier to obtain toner particles having an average particle diameter of 6.5 μm.

External Process

To 100 parts by weight of the toner particles above was added 1.0 parts by weight of commercially available silica fine particles (product name: R976, manufactured by Nippon Aerosil Co., Ltd., average primary particle size 7 nm). The external toner was obtained by stirring the mixture for 2 minutes using an airflow mixer (manufactured by Mitsui Mining Co., Ltd., Henschel mixer) with a stirring blade set to a tip speed of 40 m/sec.

Carrier Production Process

To 12 parts by weight of toluene were dissolved 0.375 parts by weight of a coating resin (1) (silicone-based, product name: KR240, manufactured by Shin-Etsu Chemical Co., Ltd.) and 0.375 parts by weight of a coating resin (2) (product name: KR251, manufactured by Shin-Etsu Chemical Co., Ltd.). Then, 0.0375 parts by weight of conductive particles (product name: VULCAN XC-72, manufactured by Cabot Corporation) and 0.0225 parts by weight of a coupling agent (product name: AY43-059, manufactured by Toray Dow Corning Co., Ltd.) were added to the mixture, and these were dispersed to afford a coating resin liquid. The surface of 100 parts by weight of a ferrite carrier core material having a volume average diameter of 40 μm was coated by the dipping method using 12.8 parts by weight of the coating resin liquid. Then, the carrier was prepared by performing a curing process at a curing temperature of 200° C. and a curing time of 1 hour, followed by sieving through a sieve having a mesh size of 150 μm.

Production Method of Two-Component Developer

The obtained external toner and the prepared carrier were adjusted and mixed so that the concentration of the external toner was 7% by weight with respect to the total amount of the two-component developer, thereby affording a two-component developer having a toner concentration of 7% by weight.

Examples 2 to 19, Comparative Examples 1 to 8

Table 1 below shows a list of binder resins used in the Examples and the like. Table 2 shows a list of waxes used in the Examples and the like. Table 3 shows a list of carrier coating resins used in the Examples and the like. Except for combining these materials as shown in Table 4 and Table 5 below, the external toner and the two-component developer were obtained in the same manner as in Example 1.

TABLE 1

| Sample name | Mp | Ti (° C.) | Tm (° C.) | THF-soluble component (% by weight) | SP value |
|---|---|---|---|---|---|
| Resin A | 12,000 | 105 | 145 | 40 | 11.5 |
| Resin B | 5,400 | 80 | 95 | 0 | 11.5 |
| Resin C | 3,900 | 77 | 90 | 0 | 11.5 |
| Resin D | 3,400 | 75 | 85 | 0 | 11.5 |
| Resin E | 6,400 | 85 | 105 | 0 | 11.5 |
| Resin F | 8,000 | 90 | 110 | 0 | 11.5 |

*Resins A to F are all amorphous polyester resins (aromatic alcohol components: PO-BPA and EO-BPA, acid components: fumaric acid and mellitic anhydride)

TABLE 2

| Sample name | Wax type | Transparent melting point (° C.) (Wax alone) | Manufacturer | Name | SP value |
|---|---|---|---|---|---|
| Wax (1) | Ester | 76 | Nichiyu | WE-15 | 8.9 |
| Wax (2) | Ester | 82 | Nichiyu | WEP-5 | 8.9 |
| Wax (3) | Ester | 79 | Nichiyu | WE-14 | 8.6 |
| Wax (4) | Ester | 71 | Nichiyu | WE-12 | 8.6 |
| Wax (5) | Paraffin | 75 | Nippon Seiro | HNP10 | 8.1 |

TABLE 2-continued

| Sample name | Wax type | Transparent melting point (° C.) (Wax alone) | Manufacturer | Name | SP value |
|---|---|---|---|---|---|
| Wax (6) | FT (Fischer-Tropsch) | 90 | Nippon Seiro | FNP90 | 8.5 |

*SP value of wax (5) refers to the value in JP 6000660 B2, and the SP value of wax (6) refers to the value in JP6504761 B2

TABLE 3

| Sample name | Resin type | Manufacturer | Name | SP value |
|---|---|---|---|---|
| Coating resin (1) | Silicone | Shin-Etsu Chemical | KR-240 | 7.5 |
| Coating resin (2) | Silicone | Shin-Etsu Chemical | KR-251 | 7.5 |
| Coating resin (3) | Acrylic | Mitsubishi Chemical | DianaILR-1065 | 10.7 |

*SP values are typical values for silicone and acrylic resins

TABLE 4

| | | | | Toner DSC measurement | | |
|---|---|---|---|---|---|---|
| | Molecular weight peak [Mp] (Resin type and ratio (% by weight)) | THF-insoluble component (% by weight) | Wax type | Endothermic peak temperature [T1] (° C.) | Exothermic peak temperature [T2] (° C.) | [T1] − [T2] (° C.) |
| Example 1 | 5,500 (A:B = 42:42) | 18 | Wax (1) | 79 | 60 | 19 |
| Example 2 | 6,600 (A:B = 42:42) | 18 | Wax (2) | 82 | 55 | 27 |
| Example 3 | 5,500 (A:B = 42:42) | 18 | Wax (3) | 80 | 65 | 15 |
| Example 4 | 4,000 (A:C = 42:42) | 18 | Wax (1) | 79 | 60 | 19 |
| Example 5 | 6,500 (A:E = 42:42) | 18 | Wax (1) | 79 | 60 | 19 |
| Example 6 | 6,400 (A:B = 28:56) | 10 | Wax (1) | 79 | 60 | 19 |
| Example 7 | 6,000 (A:B = 56:28) | 30 | Wax (1) | 79 | 60 | 19 |
| Example 8 | 6,400 (A:E = 28:56) | 10 | Wax (1) | 79 | 60 | 19 |
| Example 9 | 4,700 (A:C = 56:28) | 30 | Wax (1) | 79 | 60 | 19 |
| Example 10 | 5,500 (A:B = 44:44) | 18 | Wax (1) | 79 | 60 | 19 |
| Example 11 | 5,500 (A:B = 39.5:39.5) | 18 | Wax (1) | 79 | 60 | 19 |
| Example 12 | 5,500 (A:B = 42:42) | 18 | Wax (1) | 79 | 60 | 19 |
| Example 13 | 5,500 (A:B = 37:37) | 18 | Wax (1) | 79 | 60 | 19 |
| Example 14 | 5,500 (A:B = 43:43) | 18 | Wax (1) | 79 | 60 | 19 |
| Example 15 | 5,500 (A:B = 43:43) | 18 | Wax (1) | 79 | 60 | 19 |
| Example 16 | 5,500 (A:B = 41:41) | 18 | Wax (1) | 79 | 60 | 19 |
| Example 17 | 5,500 (A:B = 42:42) | 18 | Wax (1) | 79 | 60 | 19 |
| Example 18 | 5,500 (A:B = 43:43) | 18 | Wax (3) | 80 | 65 | 15 |
| Example 19 | 5,500 (A:B = 42.5:42.5) | 18 | Wax (3) | 80 | 65 | 15 |
| Example 20 | 5,500 (A:B = 42:42) | 18 | Wax (1) | 79 | 60 | 19 |
| Example 21 | 5,500 (A:B = 42:42) | 18 | Wax (1) | 79 | 60 | 19 |
| Comparative Example 1 | 5,500 (A:B = 42:42) | 18 | Wax (4) | 71 | 63 | 8 |
| Comparative Example 2 | 5,500 (A:B = 42:42) | 18 | Wax (5) | 77 | 70 | 7 |
| Comparative Example 3 | 5,500 (A:B = 42:42) | 18 | Wax (6) | 92 | 83 | 9 |
| Comparative Example 4 | 5,200 (A:B = 14:70) | 5 | Wax (1) | 79 | 60 | 19 |
| Comparative Example 5 | 5,800 (A:B = 75:15) | 35 | Wax (1) | 79 | 60 | 19 |
| Comparative Example 6 | 3,500 (A:D = 42:42) | 18 | Wax (1) | 79 | 60 | 19 |
| Comparative Example 7 | 8,000 (A:F = 42:42) | 18 | Wax (1) | 79 | 60 | 19 |
| Comparative Example 8 | 7,000 (A:E:F = 42:21:21) | 18 | Wax (1) | 79 | 60 | 19 |

TABLE 5

| | Flow tester measurement | | | Styrene | Wax | | Various SP values | | | |
|---|---|---|---|---|---|---|---|---|---|---|
| | Outflow start temperature [Ti] (° C.) | Melting temperature [Tm] (° C.) | [Tm] − [Ti] (° C.) | acrylic resin (% by weight) | Content (% by weight) | Dispersion diameter (μm) | Carrier resin coating layer [SP1] | Wax [SP2] | Binder resin [SP3] | [SP2] − [SP1] |
| Example 1 | 88 | 125 | 37 | 5 | 3.0 | 0.5 | 7.5 | 8.9 | 11.5 | 1.4 |
| Example 2 | 88 | 125 | 37 | 5 | 3.0 | 0.5 | 7.5 | 8.9 | 11.5 | 1.4 |
| Example 3 | 88 | 125 | 37 | 5 | 3.0 | 0.7 | 7.5 | 8.6 | 11.5 | 1.1 |
| Example 4 | 85 | 120 | 35 | 5 | 3.0 | 0.5 | 7.5 | 8.9 | 11.5 | 1.4 |
| Example 5 | 95 | 127 | 32 | 5 | 3.0 | 0.5 | 7.5 | 8.9 | 11.5 | 1.4 |
| Example 6 | 87 | 112 | 25 | 5 | 3.0 | 0.5 | 7.5 | 8.9 | 11.5 | 1.4 |
| Example 7 | 92 | 142 | 50 | 5 | 3.0 | 0.5 | 7.5 | 8.9 | 11.5 | 1.4 |
| Example 8 | 96 | 116 | 20 | 5 | 3.0 | 0.5 | 7.5 | 8.9 | 11.5 | 1.4 |
| Example 9 | 87 | 140 | 53 | 5 | 3.0 | 0.5 | 7.5 | 8.9 | 11.5 | 1.4 |
| Example 10 | 88 | 125 | 37 | 1 | 3.0 | 0.7 | 7.5 | 8.9 | 11.5 | 1.4 |
| Example 11 | 88 | 125 | 37 | 10 | 3.0 | 0.3 | 7.5 | 8.9 | 11.5 | 1.4 |
| Example 12 | 88 | 125 | 37 | 0.5 | 3.0 | 0.8 | 7.5 | 8.9 | 11.5 | 1.4 |
| Example 13 | 88 | 125 | 37 | 15 | 3.0 | 0.2 | 7.5 | 8.9 | 11.5 | 1.4 |
| Example 14 | 88 | 125 | 37 | 5 | 0.5 | 0.2 | 7.5 | 8.9 | 11.5 | 1.4 |
| Example 15 | 88 | 125 | 37 | 5 | 0.5 | 0.1 | 7.5 | 8.9 | 11.5 | 1.4 |
| Example 16 | 88 | 125 | 37 | 5 | 5.0 | 0.8 | 7.5 | 8.9 | 11.5 | 1.4 |
| Example 17 | 88 | 125 | 37 | 5 | 6.0 | 1.0 | 7.5 | 8.9 | 11.5 | 1.4 |
| Example 18 | 88 | 125 | 37 | 1 | 5.0 | 2.0 | 7.5 | 8.6 | 11.5 | 1.1 |
| Example 19 | 88 | 125 | 37 | 1 | 6.0 | 2.5 | 7.5 | 8.6 | 11.5 | 1.1 |
| Example 20 | 88 | 125 | 37 | 5 | 3.0 | 0.5 | 7.9 | 8.9 | 11.5 | 1.0 |
| Example 21 | 88 | 125 | 37 | 5 | 3.0 | 0.5 | 8.5 | 8.9 | 11.5 | 0.4 |
| Comparative Example 1 | 88 | 125 | 37 | 5 | 3.0 | 1.5 | 7.5 | 8.6 | 11.5 | 1.1 |
| Comparative Example 2 | 88 | 125 | 37 | 5 | 3.0 | 2.5 | 7.5 | 8.1 | 11.5 | 0.6 |
| Comparative Example 3 | 88 | 125 | 37 | 5 | 3.0 | 2.0 | 7.5 | 8.5 | 11.5 | 1.0 |
| Comparative Example 4 | 85 | 109 | 14 | 5 | 3.0 | 0.8 | 7.5 | 8.9 | 11.5 | 1.4 |
| Comparative Example 5 | 95 | 142 | 47 | 5 | 3.0 | 0.4 | 7.5 | 8.9 | 11.5 | 1.4 |
| Comparative Example 6 | 83 | 119 | 36 | 5 | 3.0 | 0.7 | 7.5 | 8.9 | 11.5 | 1.4 |
| Comparative Example 7 | 98 | 130 | 32 | 5 | 3.0 | 0.4 | 7.5 | 8.9 | 11.5 | 1.4 |
| Comparative Example 8 | 97 | 129 | 32 | 5 | 3.0 | 0.4 | 7.5 | 8.9 | 11.5 | 1.4 |

Example 20

In the production of the carrier, except for changing the coating resin to 0.325 parts by weight of a coating resin (1) (silicone-based resin, product name: KR240, manufactured by Shin-Etsu Chemical Co., Ltd.), 0.325 parts by weight of a coating resin (2) (silicone-based resin, product name: KR251, manufactured by Shin-Etsu Chemical Co., Ltd.), and 0.100 parts by weight of a coating resin (3) (acrylic-based resin, product name: Dianal LR-1065, manufactured by Mitsubishi Chemical Corporation), the external toner and the two-component developer were obtained in the same manner as in Example 1.

Example 21

In the production of the carrier, except for changing the coating resin to 0.260 parts by weight of a coating resin (1) (silicone-based resin, product name: KR240, manufactured by Shin-Etsu Chemical Co., Ltd.), 0.260 parts by weight of a coating resin (2) (silicone-based resin, product name: KR251, manufactured by Shin-Etsu Chemical Co., Ltd.), and 0.230 parts by weight of a coating resin (3) (acrylic-based resin, product name: Dianal LR-1065, manufactured by Mitsubishi Chemical Corporation), the external toner and the two-component developer were obtained in the same manner as in Example 1.

A list of measurement results for the external toners and the two-component developers obtained in the Examples and the like is shown in Tables 4 and 5 above, and a list of evaluation results is shown in Table 6 below.

TABLE 6

| | Fixing performance evaluation | | | | | | |
|---|---|---|---|---|---|---|---|
| | Low-temperature fixability | High-temperature fixability | Gloss unevenness | Heat-resistant storage stability | Burn-in phenomenon | Charging stability | Overall evaluation |
| Example 1 | ◎ | ◎ | ◎ | ◎ | ◎ | ◎ | ◎ |
| Example 2 | ◎ | ◎ | ◎ | ○ | ◎ | ◎ | ○ |
| Example 3 | ○ | ○ | ○ | ◎ | ○ | ○ | ○ |
| Example 4 | ◎ | ○ | ◎ | ○ | ◎ | ◎ | ○ |
| Example 5 | ○ | ◎ | ◎ | ◎ | ◎ | ◎ | ○ |
| Example 6 | ◎ | Δ | ○ | ○ | ◎ | ◎ | Δ |
| Example 7 | Δ | ◎ | ◎ | ◎ | ◎ | ◎ | Δ |
| Example 8 | Δ | ○ | ○ | ○ | ◎ | ◎ | Δ |
| Example 9 | ○ | ◎ | ◎ | ◎ | ◎ | ◎ | ○ |
| Example 10 | ◎ | ◎ | ○ | ○ | ○ | ◎ | ○ |
| Example 11 | ○ | ◎ | ◎ | ◎ | ◎ | ◎ | ○ |
| Example 12 | ◎ | ◎ | ○ | ○ | ○ | ◎ | ○ |
| Example 13 | Δ | ◎ | ◎ | ◎ | ◎ | ◎ | Δ |

TABLE 6-continued

| | Fixing performance evaluation | | | | | | |
|---|---|---|---|---|---|---|---|
| | Low-temperature fixability | High-temperature fixability | Gloss unevenness | Heat-resistant storage stability | Burn-in phenomenon | Charging stability | Overall evaluation |
| Example 14 | ○ | ○ | ◎ | ○ | ◎ | ◎ | ○ |
| Example 15 | Δ | Δ | ◎ | ○ | ◎ | ◎ | Δ |
| Example 16 | ◎ | ◎ | ○ | ○ | ○ | ○ | Δ |
| Example 17 | ◎ | ◎ | Δ | Δ | Δ | ○ | Δ |
| Example 18 | ○ | ○ | Δ | ○ | ○ | Δ | Δ |
| Example 19 | ○ | ○ | Δ | Δ | Δ | Δ | Δ |
| Example 20 | ◎ | ◎ | ◎ | ◎ | ◎ | ○ | ○ |
| Example 21 | ◎ | ◎ | ◎ | ◎ | ◎ | Δ | Δ |
| Comparative Example 1 | Δ | ○ | X | ◎ | ○ | Δ | X |
| Comparative Example 2 | X | ○ | X | ◎ | X | X | X |
| Comparative Example 3 | X | ○ | X | ◎ | X | Δ | X |
| Comparative Example 4 | ◎ | X | Δ | Δ | ○ | ○ | X |
| Comparative Example 5 | X | ◎ | ◎ | ◎ | ◎ | ◎ | X |
| Comparative Example 6 | ◎ | X | ○ | Δ | ○ | ○ | X |
| Comparative Example 7 | X | ◎ | ◎ | ◎ | ◎ | ◎ | X |
| Comparative Example 8 | X | ◎ | ◎ | ◎ | ◎ | ◎ | X |

As is clear from Table 6, the toners and the two-component developers obtained in Examples 1 to 21, which include a polyester resin as the binder resin and an ester wax as the mold release agent, have an Mp of 4,000 or more and 6,500 or less, have a THF-insoluble component of 10% by weight or more and 30% by weight or less with respect to 100% by weight of the toner, and have a value T1-T2 of 15° C. or more and 30° C. or less, the evaluation of the low-temperature fixability and the high-temperature fixability were both excellent, and the evaluation of the gloss unevenness was also excellent.

In contrast, Comparative Examples 1 to 8, which did not satisfy these requirements, were inferior to the Examples because the evaluation of at least one of the low-temperature fixability, the high-temperature fixability, and the gloss unevenness was "x (poor)".

Other Embodiments

The embodiment disclosed here is exemplary in all respects, and is not a basis for a limited interpretation. Therefore, the technical scope of the present invention is not only interpreted by the above embodiment, but is also defined based on the claims. Furthermore, the technical scope of the present invention includes all modifications within a meaning and scope equivalent to the claims.

What is claimed is:

1. A toner including toner particles containing a polyester resin as a binder resin, and an ester wax as a mold release agent, wherein a peak top molecular weight of a tetrahydrofuran-soluble component of the toner, as measured by gel permeation chromatography, is 4,000 or more and 6,500 or less, a tetrahydrofuran-insoluble component of the toner is 10% by weight or more and 30% by weight or less with respect to 100% by weight of the toner, given an endothermic peak temperature T1 in a heating process and an exothermic peak temperature T2 during a cooling process originating from the ester wax as measured using a differential scanning calorimeter, the value T1-T2 is 15° C. or more and 19° C. or less, given an outflow start temperature Ti of the toner and a softening temperature Tm of the toner, which are measured by a flow tester, Ti is 85° C. or more and 95° C. or less, Tm is 120° C. or more and 140° C. or less, and the value Tm-Ti is 25° C. or more and 50° C. or less.

2. The toner according to claim 1, wherein the toner particles contain a styrene-acrylic resin, and a content of the styrene-acrylic resin is 1% by weight or more and 10% by weight or less with respect to 100% by weight of the toner particles.

3. The toner according to claim 1, wherein a content of the ester wax is 0.5% by weight or more and 5.0% by weight or less with respect to 100% by weight of the toner particles.

4. The toner according to claim 1, wherein an average dispersion diameter of the ester wax in the toner particles is 0.2 0.3 μm or more and 2.0 μm or less.

5. A two-component developer including the toner according to claim 1, and a carrier, wherein the carrier has a carrier core material, and a resin coating layer that coats the carrier core material, and given an SP value of a resin in the resin coating layer SP1, an SP value of the ester wax SP2, and an SP value of the binder resin SP3, $SP1<SP2<SP3$ and $SP2-SP1>1$.

* * * * *